Dec. 14, 1926.
H. G. JORGENSEN
1,610,554
AUTOMOBILE DOOR BUFFER
Filed Dec. 6, 1922
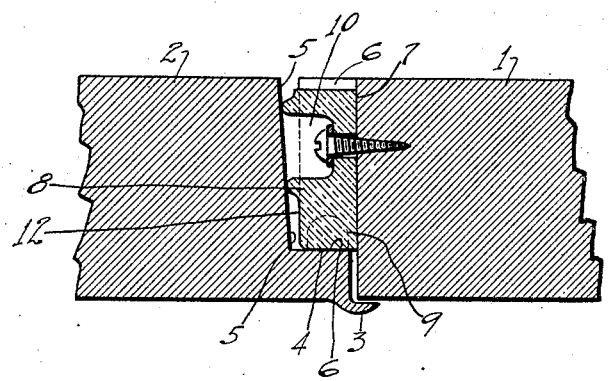
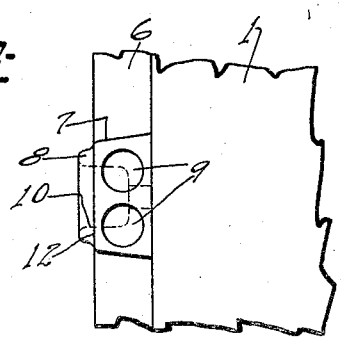
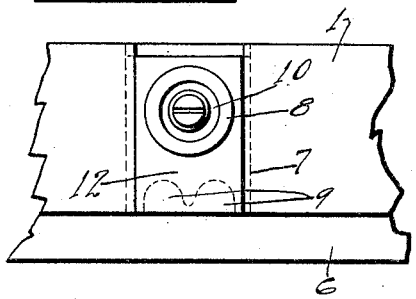
Inventor
Hans G. Jorgensen
by T. R. Lord
Attorney Patented Dec. 14, 1926.

1,610,554

UNITED STATES PATENT OFFICE.

HANS G. JORGENSEN, OF ERIE, PENNSYLVANIA.

AUTOMOBILE DOOR BUFFER.

Application filed December 6, 1922. Serial No. 605,310.

Automobile doors present a peculiar problem as to supplying a desirable buffer, the principal purpose of the buffer being not simply to receive the shock of closing the door but to prevent the noisy action of the door after it is closed. This is accomplished in the present invention by supplying the buffer with a vacuum cup which engages the door and holds it against objectionable movement.

The invention is illustrated in the accompanying drawings as follows:—

Fig. 1 shows a horizontal section of a door and part of an automobile body with the buffer in place.

Fig. 2 an end view of the buffer.

Fig. 3 a side elevation of the same.

1 marks the automobile body, and 2 the door. These may be of any ordinary construction. With the one shown there is an overlapping lip 3 and the edge of the door is stepped forming an engaging face 4 and an overlapping portion 5. The edge of the body is ordinarily stepped at 6 to receive the step 4 and notched at 7 to receive a buffer 8.

The buffer has a cup 10 formed in the face toward the overlapping edge 5 and the overlapping edge 5 is slightly slanting so that as the door closes it wipes the walls of the cup 10 and forms a closure with the cup. The forward part of the buffer is cut away at 12 to give clearance for the movement of the edge 10 past this part of the buffer. The outer face of the buffer is provided with small cups 9, preferably a plurality of these, as shown two, and these cups are directly engaged by the stepped face 4 moving directly toward and from them so that they form a sealing contact with these cupped faces. In this manner the two faces of the door are engaged by cupped faces and this engagement assures a quicker and more controlled action of the door than where the plain buffer is used.

What I claim as new is:—

1. The combination of a door; and a buffer formed of rubber and having an air-tight cupped contact surface engaged by the door when closed, the walls of the cup being adapted to make an annular closing contact.

2. The combination of a door; and a buffer formed of rubber and having an air-tight cupped contact surface engaged and disengaged by a movement of the door face toward and from the cupped surface, the cupped surface being engaged by the face with the door in closed position and forming an annular air-tight contact with said face.

3. The combination of a door; and a buffer formed of rubber and having an air tight cupped contact surface engaging the door by a wiping movement of the door along the edges of the cupped surface forming an air-tight contact with said cupped surface.

4. An automobile door buffer formed of rubber and having two contact cup engaging surfaces, said surfaces having faces at angles to each other.

5. An automobile door buffer formed of rubber and having two contact cup engaging surfaces, said surfaces having faces at angles to each other, one face being adapted to be engaged by a movement directly toward and from the contacting face and the other cupped face being engaged by an overlapping movement of a door surface.

6. The combination of a door having a stepped edge; a buffer having two surfaces, one engaged by a face of the stepped edge extending at an angle to the direction of movement of the door and the other of the cupped surfaces being engaged by a wiping movement of the door.

In testimony whereof I have hereunto set my hand.

HANS G. JORGENSEN.